R. H. WHITE.
STUMP EXTRACTOR AND PILER.
APPLICATION FILED AUG. 22, 1916.
1,247,194.
Patented Nov. 20, 1917.
2 SHEETS—SHEET 1.
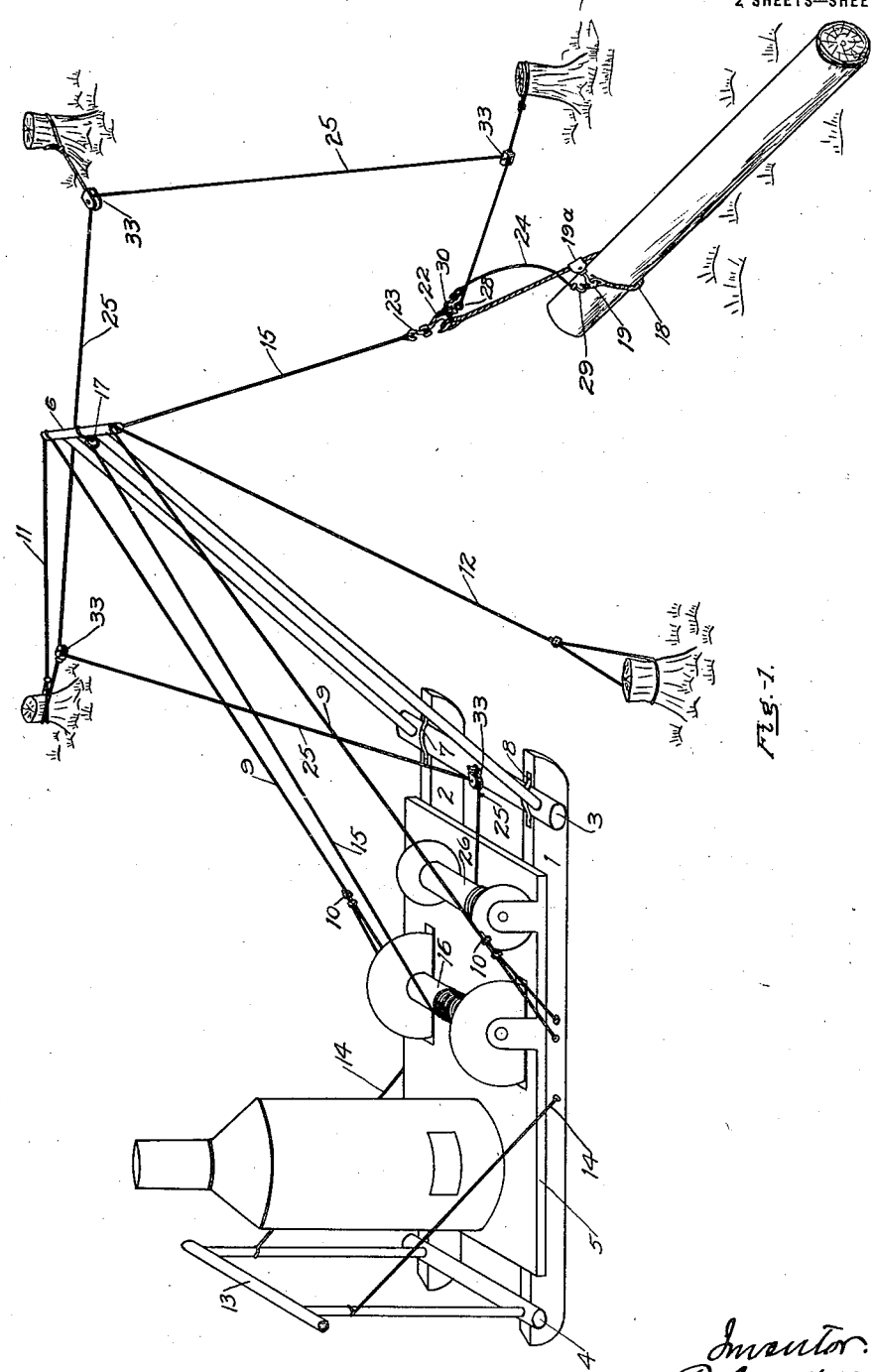
Inventor:
Robert H. White

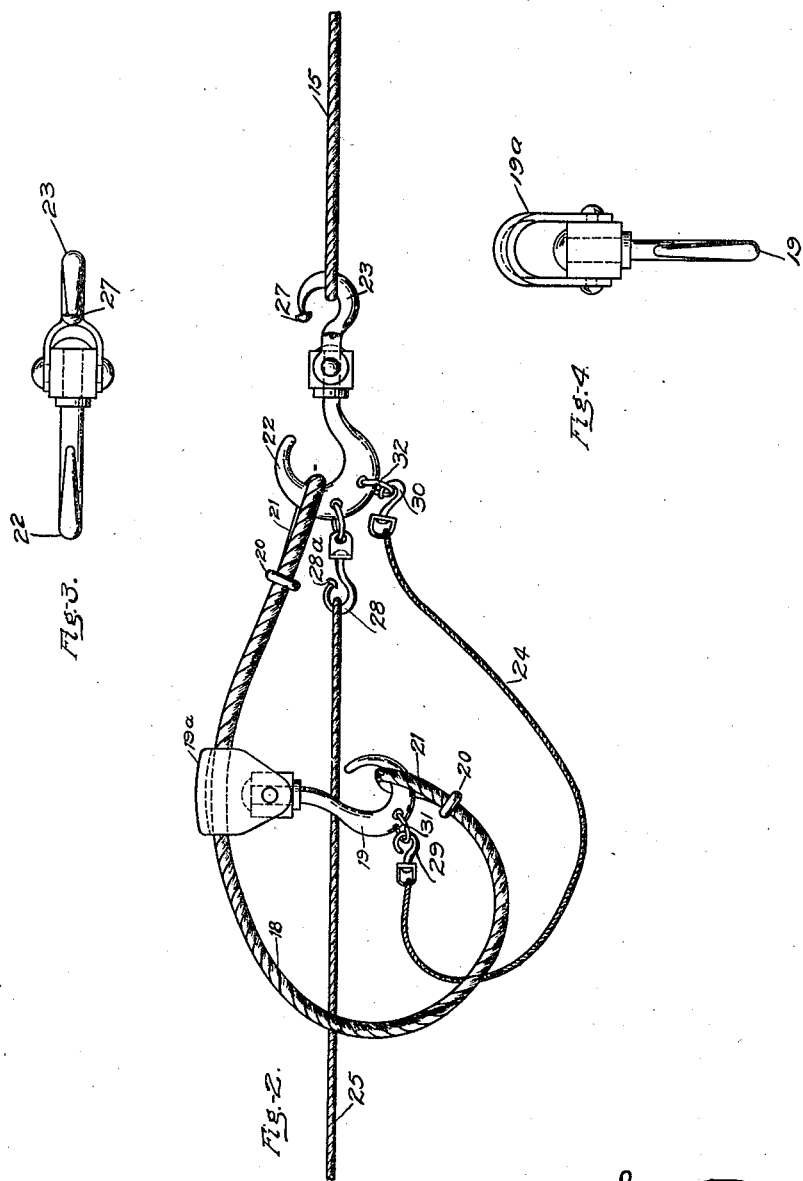

UNITED STATES PATENT OFFICE.

ROBERT H. WHITE, OF MONROE, WASHINGTON.

STUMP EXTRACTOR AND PILER.

1,247,194.  Specification of Letters Patent.  Patented Nov. 20, 1917.

Application filed August 22, 1916. Serial No. 116,237.

*To all whom it may concern:*

Be it known that I, ROBERT H. WHITE, a citizen of the United States, residing at Monroe, in the county of Snohomish and State of Washington, have invented a new and useful Improvement in Stump Extractors and Pilers, of which the following is a specification.

My invention relates to stump extractors and pilers, and comprises certain new and useful improvements therein, the object being to provide a simple and compact structure that is adapted to support a donkey engine of sufficient power to extract large stumps and pile them for burning.

Heretofore it has been common in clearing logged-off lands, particularly on the Pacific coast, to erect a gin-pole for use as a derrick in connection with a donkey engine, not only to extract stumps but to draw them to and deposit them about the gin-pole to be burned after they have dried sufficiently. By this method, when all stumps are extracted and piled within a given radius of the pole, a new location is selected for further operations of same character to where the donkey engine is moved; such change of location necessitates the selection and installation of a new gin-pole.

To avoid the delay and expense incident to such method I have devised a derrick mounted on the forward end of a movable support, on the after-part of which I place a donkey engine with the customary winding drums to extract stumps and transport them to a predetermined spot where they are automatically piled as released from the choker.

My device also contains certain other novel parts and combinations and essential accessories which will be hereinafter fully described, and particularly set forth in the claims terminating this specification, so as to enable others skilled in the art to which my invention appertains to make and use the same.

In the drawings forming a part of this specification, and in which like numerals refer to like parts throughout the several views, Figure 1 is a perspective view of my improved stump extractor and piler.

Fig. 2 is a perspective view of the tackle used.

Fig. 3 is an end view of compound hook.

Fig. 4 is an end view of choker hook.

The stump-extractor is so constructed and arranged that the stability of the base or movable support is not disturbed by extracting and transporting stumps of large caliber.

In carrying out the features of my invention I prefer to rest the platform 5 upon a frame comprising longitudinally extending side bars 1 and 2 which are connected by cross bars 3 and 4.

The side bars are preferably curved up at each end, similar to the runners of a sled, which enables the device to be more readily moved from one location to another. The side bars may be made of logs rounded at each end instead of sawed timber curved at each end as shown.

Cross bar 4 and platform 5 are independently and fixedly secured to side bars 1 and 2, while cross bar 3 is movably secured thereto as will be hereinafter explained.

The frame that supports the platform is of considerable length and on the after-part of the platform is mounted a heavy donkey-engine and the usual drums controlling the haul line and back-haul line. By thus constructing the frame for the platform and placing the engine, greater stability is given to the hoist-head and effective means provided for holding the apparatus against any movement or tipping toward the stump during the extracting operations.

The derrick which is mounted on the forward end of the frame, consists of two uprights spread apart at their base and fixedly secured to cross bar 3; the upper ends of the uprights converge and are held in fixed relation by cross bar 6.

Cross bar 3, which is preferably cylindrical, rests in semi-cylindrical grooves in side bars 1 and 2, and is movably secured therein by means of clamps 7 and bolts 8 of suitable construction. The bolts are positioned with their heads on the undersides of side bars 1 and 2 so that the nut ends of the bolts will project upwardly through clamps 7 thereby making the nuts readily accessible for loosening and tightening whenever the inclination of the derrick is to be changed. This construction enables the derrick to be readily adjusted to any desired inclination and to be so held by cables 9 which extend rearwardly to and through side bars 1 and 2 and return to be adjustably secured to themselves by clamps 10, and by guy wires 11 and 12 that are secured to ends of cross bar 6 at the top of the derrick and anchored to stumps, trees or other suitable objects.

In the rear of the engine I have constructed a stationary frame 13 which is attached to side bars 1 and 2 and is held securely in vertical position by guy wires 14. This frame is designed especially as a support for the derrick when the machine is being moved to a new location or field of operations, or when the apparatus is not in use.

The head end of cable 15 is firmly secured to drum 16 of the engine and extended forwardly and upwardly over pulley 17 at the top of the derrick, the free end of the cable being provided with a loop; and the head end of line 25 is secured to drum 26 of the engine and passes through a series of guides 33, one of which is on cross bar 3 at the base of the derrick, and the others to one side of the path of cable 15, and are anchored to stumps, trees or other suitable objects.

Reference-numeral 18 indicates what may be termed a "double-ended" choker, that is, a choker line having a loop or eye at each end so that whichever end is the most accessible may be looped about a log. The choker is provided with a swivel-hook 19 having a housing 19<sup>a</sup> through which the choker line freely moves, and in order to prevent the choker line from sliding through the housing completely or from being choked therein by a spliced loop or eye, two collars, 20, are placed on the choker line, one at each end immediately back of the spliced loop or eye 21.

In operating this device, choker 18 is looped about a log and engaged by swivel-hook 19 to form a sling; and the loop at the other end is engaged by hook 22 which is joined by a cross-head swivel to hook 23 that engages with the loop on the free end of cable 15. After these connections, drum 16 of the engine, to which the head end of cable 15 is attached, is rotated to wind the cable thereon and when the slack has been taken up the tension pulls the choker line through housing 19<sup>a</sup> on hook 19 thereby gradually tightening its grip on the log or stump, as the case may be, and the continued winding of said cable extracts the stump and drags it or the log toward the engine over roots, stumps, and other resistances until it reaches its destination when the slackening of the hauling line and the tensioning of the haul-back line release hook 22 from the loop in the end of choker line 18, and a continuing pull on the haul-back line tightens trip line 24 and thereby frees hook 19 from the loop at the other end of said choker line, thus effecting a complete release of the load; then by operating drums 16 and 26 at like speed in opposite directions the choker line is returned to the field for attachment to another load.

If for any reason it be not feasible to connect the choker to a stump or log in the manner described, it may be operably connected in some other manner.

It will be noted that the extreme point or bill of hook 23 is provided with a cross bar 27 for the purpose of preventing the loop at the end of cable 15 from slipping therefrom when the cable becomes slack by dropping the log from the sling; and a similar cross bar 28<sup>a</sup> is provided at the end of hook 28 for like purpose in connection with cable 25.

It will also be observed that very desirable and important features of this tackle reside in the means devised for maintaining a workable association of all the parts without liability to unintentional separation although they are quickly separable for repair or other purpose in the manner described and shown, that is to say:—

The trip line 24 may be disconnected from the choker line 18 and cable 15 by passing hooks 29 and 30 through channels 31 and 32 shown in the rings attached to hooks 19 and 22, respectively. Then line 25 is disengaged from hook 28 and choker line 18 from hook 22 and the separation will be complete for any purpose desired.

After all stumps have been extracted and logs removed within reach of the derrick as positioned for operation, and a new location for further operations is desired, cable 15 is removed from pulley 17 which is attached to cross bar 6 at the top of the derrick; nuts on bolts 8 are loosened to release clamps 7; guys 11 and 12 are detached from their anchorage; guides 33 are removed from their anchorage; and the top of the derrick is swung backward over the engine and rested upon stationary frame 13; the apparatus is then in condition for removal to a new location. Cable 15 is used as a pulling line by drawing the free end thereof out far ahead of the machine and attaching it to a stump or other suitable object; the engine is then operated whereby the machine is pulled along from place to place. This is a straight drag over the ground, and the device is so constructed that it readily overcomes the resistances due to contact with roots, stumps, logs, and the like, and may practically be taken anywhere, thereby enabling the apparatus to be quickly positioned with respect to the extracting of any particular stump.

The delays, accidents, and expense that are generally present in the operations of a device of this character, are almost entirely eliminated by the use of swivel-hooks so constructed that no amount of coiling, twisting, or turning interferes with their efficiency.

Some of the mechanism herein disclosed is claimed in a co-pending application Serial Number 188,272, filed August 27, 1917, which is a division of this application.

I claim as my invention—

1. In a device of the character described, a choker line having a loop at each end and a swivel hook provided with a housing mounted thereon intermediate its ends and through which the choker line freely moves, and means for preventing the loops from choking in the housing or passing therethrough; either end of the choker line being adapted to be looped about an object and engage the swivel hook to form a sling.

2. A device of the character described, comprising a choker line having a loop at each end thereof, a swivel hook provided with a housing and mounted on the choker line intermediate its ends and through which housing the choker line freely moves; hauling and haul-back lines each provided with a loop at its free end, said lines being detachably connected to one another by means adapted to maintain flexible connection when either or both lines are slack; either end of the choker line being adapted to be looped about a log or stump and engage the swivel hook to form a sling, and the other end of the choker line being detachably connected to the hauling line; and a trip line connected with the swivel hook on the choker line to automatically release the load.

3. A device of the character described, comprising a choker line having a loop at each end thereof, a swivel hook provided with a housing and mounted on the choker line intermediate its ends and through which housing the choker line freely moves; hauling and haul-back lines each provided with a loop at its free end, said lines being detachably connected to one another by hooks that are adapted to maintain said connection when either or both lines are slack; either end of the choker line being adapted to be looped about a log or stump and engage the swivel hook to form a sling and the other end of the choker line being detachably connected to the hauling line; and tensioning means for automatically releasing the load.

4. A device of the character described, comprising a choker line having a loop at each end thereof, a swivel hook provided with a housing and mounted on the choker line intermediate its ends and through which housing the choker line freely moves and means for preventing the loops from choking in the housing or passing therethrough; hauling and haul-back lines each provided with a loop at its free end, said lines being detachably connected to one another by hooks that are adapted to maintain said connection when either or both lines are slack; either end of the choker line being adapted to be looped about a log or stump and engage the swivel hook to form a sling, and the other end of the choker line being detachably connected with the hauling line; and a trip line connected with the swivel hook on the choker line.

5. A device of the character described, comprising a choker line having a loop at each end thereof, a swivel hook provided with a housing and mounted on the choker line intermediate its ends and through which housing the choker line freely moves, and means for preventing the loops from choking in the housing or passing therethrough; hauling and haul-back lines each provided with a loop at its free end, said lines being detachably connected to one another by hooks that are adapted to maintain said connection when either or both lines are slack; either end of the choker line being adapted to be looped about a log or stump and engage the swivel hook to form a sling, and the other end of the choker line being detachably connected with the hauling line; and tensioning means for automatically releasing the load.

ROBERT H. WHITE.